UNITED STATES PATENT OFFICE.

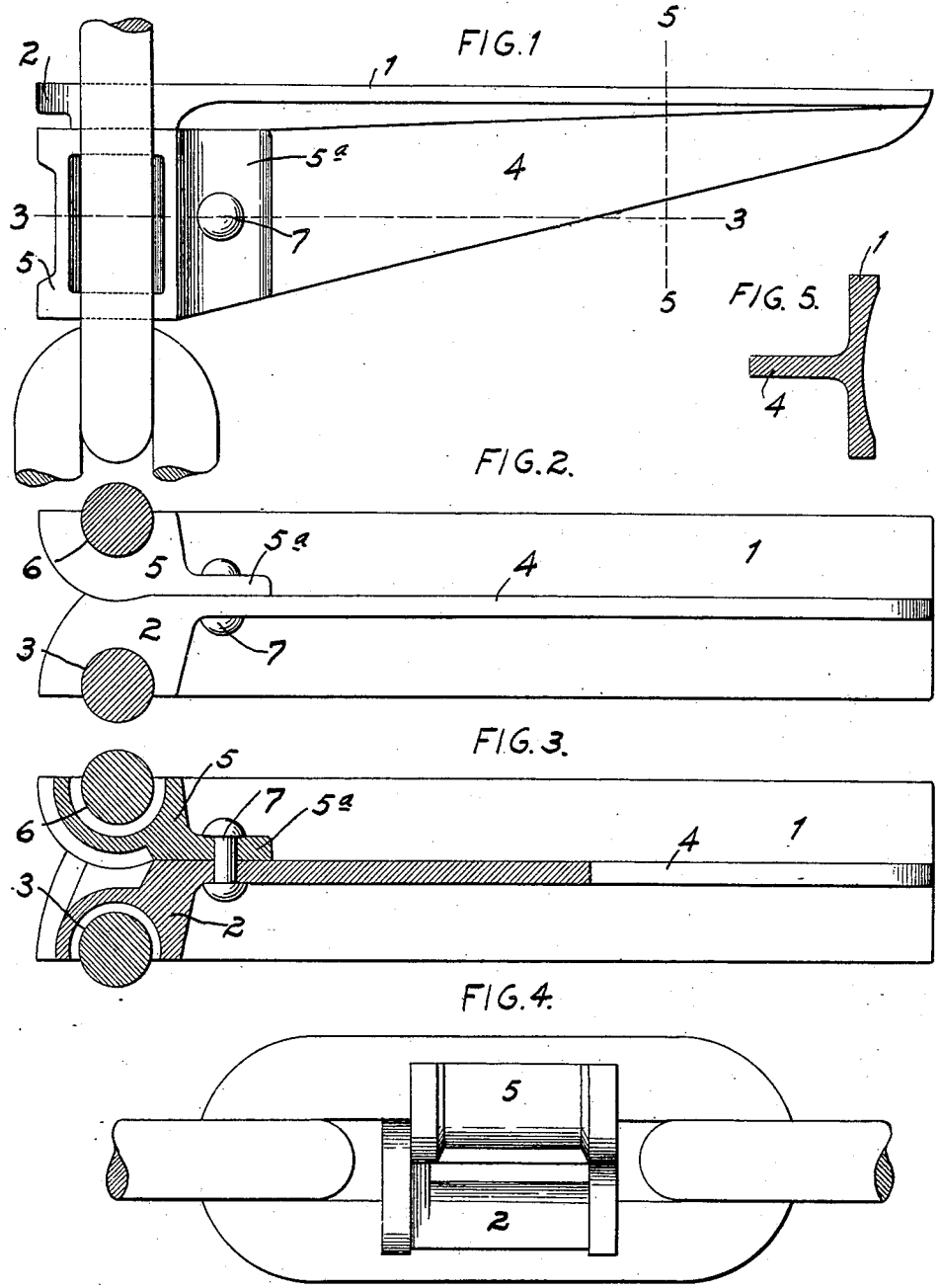

THOMAS A. COLEMAN, OF LONGVILLE, LOUISIANA, ASSIGNOR TO C. T. PATTERSON COMPANY, LTD., OF NEW ORLEANS, LOUISIANA, A CORPORATION OF LOUISIANA.

CHAIN CONVEYER.

977,273. Specification of Letters Patent. Patented Nov. 29, 1910.

Application filed June 16, 1909. Serial No. 502,519.

*To all whom it may concern:*

Be it known that I, THOMAS A. COLEMAN, a citizen of the United States, residing at Longville, Louisiana, have invented a certain new and useful Improvement in Chain Conveyers, of which the following is a full, clear, and exact description, such as will enable others skilled in the art to which it appertains to make and use the same, reference being had to the accompanying drawings, forming part of this specification.

My invention relates to new and useful improvements in chain conveyers particularly adapted for use in carrying off refuse lumber from sawmills, etc., and is designed as an improvement on the chain conveyer shown and described in an application for United States Letters Patent filed by me March 11, 1909, serially numbered 482,751.

The essential features of my present invention reside in a two-part flight which may be easily and quickly attached to one of the vertical links of a conveyer chain in such a manner as to not impair the strength thereof.

I propose to form the main body portion of the flight in one piece, and to provide the same with a head which engages one-half of the body portion of a chain length, there being a cap or block rigidly fixed to the head for engaging the opposite half of the body portion of the link.

To the above purposes, my invention consists in certain novel features of construction hereinafter described and claimed.

In the drawings:—Figure 1 is a plan view of a portion of a conveyer chain provided with a flight of my improved construction. Fig. 2 is a rear elevation of the flight, showing one of the links of the conveyer chain in section. Fig. 3 is a section taken on the line 3—3, Fig. 1. Fig. 4 is an elevation of the conveyer chain, showing the end of one of the flights thereon. Fig. 5 is a cross section taken on the line 5—5, Fig. 1.

The main body portion of the flight of my improved chain conveyer comprises a vertically-disposed plate 1, the front face of which is preferably concave in cross section in order to overcome any tendency of the flight to climb or ride over the refuse in the conveyer trough. Formed integral with one end of this plate is a head 2, in the under side of which is formed a groove 3 which occupies a position approximately at right angles to the plane occupied by the plate 1. Formed integral with the rear side of the plate 1, midway between the top and bottom edges thereof, is a horizontally-disposed reinforcing flange 4, one end of which is integral with the upper portion of the head 2.

5 designates a block in the top of which is formed a transversely-disposed groove 6, said block being substantially of the same shape as is the head 2. This block 5 occupies a position on top of the head 2 and formed integral with one side of said block is an ear 5ª which rests on top of the flange 4 at the point where the same joins the head 2, and passing through said ear and flange is a rivet 7 or like fastening device.

When my improved flight is applied to a conveyer chain, the head 2 is engaged on the lower half of one of the vertical links of the chain and the block 5 is now positioned on top of the head 2 beneath the upper half of the vertical link and said block is fixed to the body of the flight by means of the rivet 7. Thus the two parts of the flight are rigidly connected to one another and to the chain.

A chain conveyer of my improved construction is comparatively simple, very strong and durable, and the flights, which are composed of but two parts, are easily and quickly applied to the conveyer chain.

It will be readily understood that minor changes in the construction and form of my improved conveyer can be made and substituted for those herein shown and described without departing from the spirit of my invention.

I claim:

1. The combination with a conveyer-chain, of a flight comprising a vertically disposed plate, a head on the end thereof, in the underside of which head is formed a link receiving groove, a reinforcing flange integral with the rear side of the plate, and with the head, a block positioned on the head, in which block is formed a link receiving groove, an extension on the block which overlies a portion of the reinforcing flange, and fastening means passing through the extension, and the reinforcing flange.

2. The combination with a conveyer chain, of a flight comprising a vertically disposed plate, a head formed on one end thereof, there being a link receiving groove formed in the under side of the head, a reinforcing flange on the rear side of the plate, a block positioned on the head and provided with a link receiving groove, an ear projecting from said block and engaging the reinforcing flange, and a fastening device passing through said ear and the flange.

In testimony whereof I hereunto affix my signature in the presence of two witnesses, this 9th day of June, 1909.

THOMAS A. COLEMAN.

Witnesses:
H. T. ROEHL,
E. W. ZOOMER.